United States Patent [19]

Borzym

[11] Patent Number: 4,796,498
[45] Date of Patent: Jan. 10, 1989

[54] METHOD FOR DIMPLE FREE GUILLOTINE CUTTING OF MULTIPLE WALL TUBE

[75] Inventor: John J. Borzym, Birmingham, Mich.
[73] Assignee: Alpha Industries, Inc., Novi, Mich.
[21] Appl. No.: 18,027
[22] Filed: Feb. 24, 1987
[51] Int. Cl.⁴ .................. B26D 3/06; B26D 3/16
[52] U.S. Cl. .......................... 83/49; 83/54; 83/319; 83/875; 83/916
[58] Field of Search .............. 83/875, 877, 54, 916, 83/917, 835, 300, 318, 319, 320, 49; 81/9.51

[56] References Cited

U.S. PATENT DOCUMENTS

| | | | |
|---|---|---|---|
| 3,120,153 | 2/1964 | Proctor et al. | 83/875 |
| 4,036,091 | 7/1977 | Borzym | 83/519 |
| 4,108,029 | 8/1978 | Borzym | 83/54 |
| 4,628,599 | 12/1986 | Bermieri, Jr. et al. | 81/9.51 |

Primary Examiner—Frank T. Yost
Assistant Examiner—Scott A. Smith
Attorney, Agent, or Firm—Krass & Young

[57] ABSTRACT

A method for dimple free guillotine cutting of multiple wall tube which involves first cutting a transverse notch substantially completely through the outermost tube wall and secondly cutting a notch through the path of the first notch but of greater depth to extend partially through the innermost tube wall. The cutoff function is then finalized by means of a guillotine blade which enters through the coextensive notches. Both pull-across and thrust blades for carrying out the method are disclosed.

3 Claims, 2 Drawing Sheets

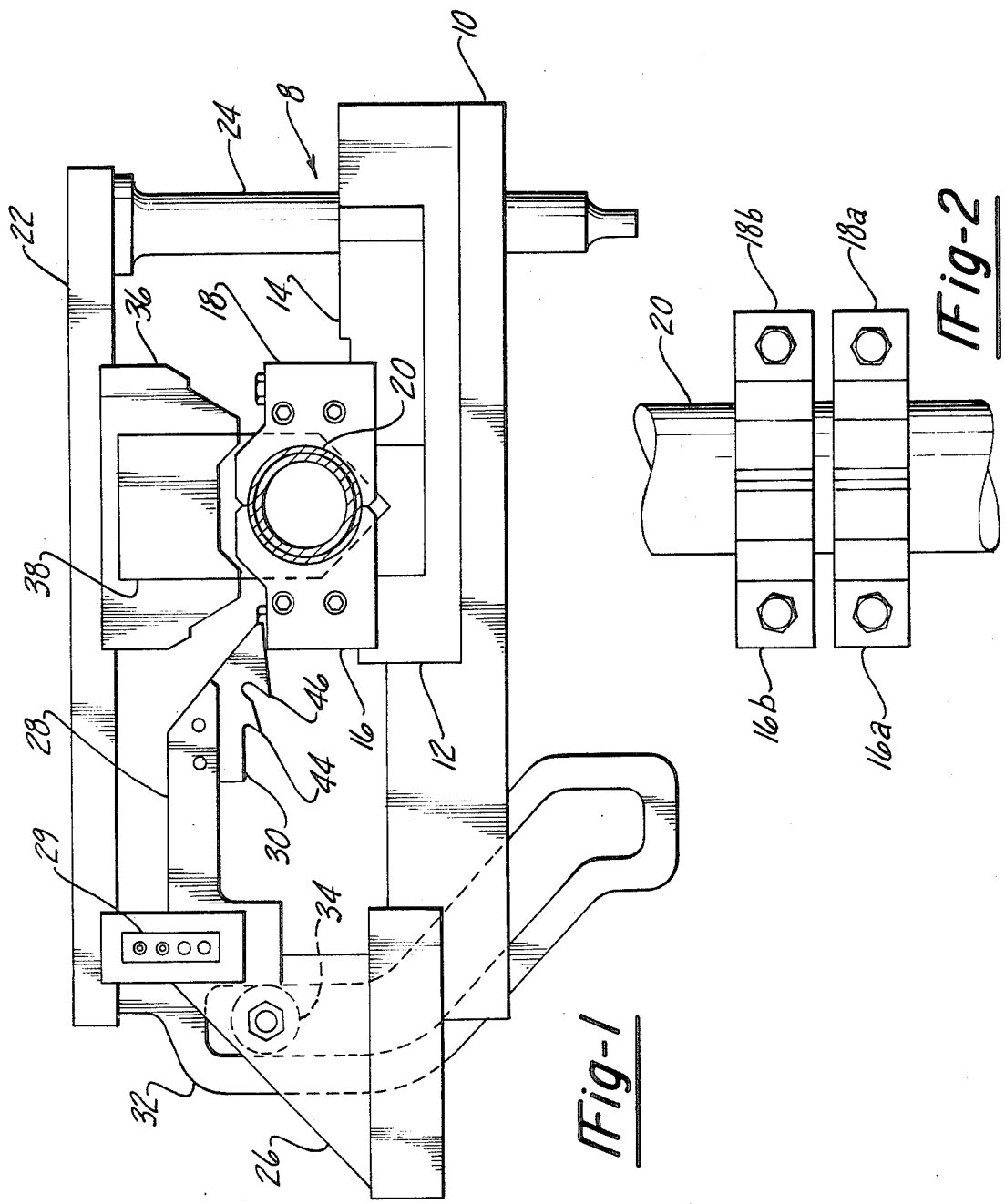

METHOD FOR DIMPLE FREE GUILLOTINE CUTTING OF MULTIPLE WALL TUBE

INTRODUCTION

This invention relates to dimple free guillotine type cutting of multiple wall tubing and particularly to a method and apparatus for performing such an operation.

BACKGROUND OF THE INVENTION

Guillotine type cutting of steel tubing is extremely popular, particularly in the manufacture of welded-seam steel tubing, because of the speed and repetition rate with which the cutting operation may be performed. It has been known for many years that the formation of a dimple due to the partial collapse of the steel wall during the initial penetration of the guillotine blade may be avoided by cutting a transverse notch through the tube wall at the point of entry of the guillotine blade. See U.S. Pat. No. Re. 22,114 "Cutoff Mechanism" issued June 16, 1942 to Alexander Borzym which discloses an apparatus for simultaneously notching both top and bottom of the tube, thereby to prevent the tendency of the tube to roll during the notching operation. A later example is shown in U.S. Pat. No. Re. 30,025 a reissue of U.S. Pat. No. 4,036,091 issued July 19, 1977 to Alexander Borzym. In both of these reissued patents the notching operation is performed by a blade which is driven across the tube in a thrust direction; i.e. the blade is effectively pushed across the tube. A still later example is shown in U.S. Pat. No. 4,108,029 "Cutoff Die Set" issued Aug. 22, 1978 to Alexander Borzym. In this latter example, the notching blade, which may have several teeth of differing depth, is drawn or pulled across the tube axis from an initial position which lies directly in the path of the guillotine blade. A still further example of the latter type of notching mechanism is disclosed in U.S. Pat. No. 4,392,644 "Tube Cutting Apparatus" issued July 12, 1983 to John J. Borzym.

All of the patents listed above illustrate methods and apparatus for dimple free cutting of single wall tubing. It has been found that the straightforward application of the prior art techniques to the cutting of multiple wall tubing is not satisfactory; i.e. simply cutting a notch part way through the outermost tube wall results in a dramatic collapse of the innermost tube wall when the guillotine blade pushes through. Similarly, attempts to make a single notching cut which cuts fully through the outer wall and partially through the inner wall cannot produce satisfactory results. It is, therefore, the principal objective of the present invention to provide for the satisfactory dimple free guillotine style cutting of multiple wall tubing.

BRIEF DESCRIPTION OF THE INVENTION

The invention, as indicated immediately above, is directed toward the dimple free guillotine style cutting of multiple wall tubing and may be defined with respect to both method and apparatus aspects. According to the method aspect, the notching function is carried out in stages; i.e. a first notching cut is made across the tube axis to a depth substantially equal to the outermost tube wall, and the last notching step is carried out through the path of the first notching step but to a depth which extends partially through the innermost tube wall and the guillotine blade is caused thereafter to pass through the notches and fully sever the tube.

The method is most advantageously carried out using a single blade having multiple teeth, similar to the blade shown in FIG. 5 of U.S. Pat. No. 4,108,029, the depths of which teeth are carefully selected to accomplish the sequential depth cutting steps set forth immediately above. Under normal circumstances, the construction of multiple wall tubing involves only two walls or plies. Therefore, the first tooth or cutting point on the blade to engage the tube performs the full depth notching of the outermost wall and the second cutting point performs the partial notching of the innermost tube wall. However, it should be understood that notching of tubing having three or more walls is also possible simply by extending the concept of the invention to include intermediate teeth or cutting points, each of which is selected to cut fully through its particular tube wall.

The apparatus aspect of the invention includes blades corresponding to the description given immediately above. In one form, the blade is specifically adapted for a pull-across motion of the type disclosed in U.S. Pat. No. 4,392,644 and in another embodiment the blade is specifically adapted for the thrust movement of the more conventional apparatus.

BRIEF DESCRIPTION OF THE DRAWING

FIG. 1 is a schematic view of a die set incorporating a blade which embodies the apparatus aspect of the invention and which is capable of carrying out the method aspect of the invention;

FIG. 2 is a top view of the clamping jaws in the arrangement of FIG. 1;

DETAILED DESCRIPTION OF THE SPECIFIC EMBODIMENT

Figure 3:
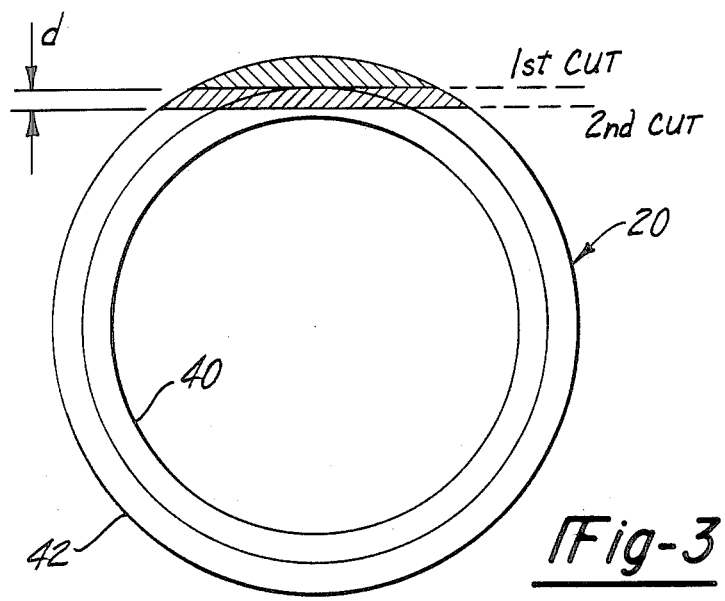
FIG. 3 is a cross-sectional view of a double wall tube showing the specific depth of sequence of the notching function.

Referring first to FIGS. 1 and 2, the invention is shown embodied in a die set 8 which can be used for both stationary cutting of tubing as well as on-the-fly cutting of tubing as it emerges from a tube mill. The die set 8 comprises a base or lower platen 10 which supports slide elements 12 and 14 which in turn carry clamping jaws 16 and 18 for securely clamping double wall tube 20 during a cutting operation.

The die set further comprises an upper platen 22 which is mounted by way of guide pins and bushings (not shown) for reciprocal vertical motion relative to the lower platen 10. Power to perform the reciprocal displacement is supplied by a mechanical press, as will be apparent to those skilled in the art. Upper platen 22 carries a first depending cam 24 which operates a mechanism (not shown) for closing the clamping jaws 16 and 18 at the beginning of the cutting operation and opening the jaws 16, 18 at the end of the operation.

Mounted slidably on the lower platen 10 is a bracket 26 which supports an arm 28 which in turn carries a notching blade 30, the details of which will be described with reference to FIGS. 3 and 4. The vertical location of arm 28 on bracket 26 is adjustable by means 29 to accommodate different tube diameters. To cause transverse reciprocal displacement of the arm 28 and the blade 30, a cam 32 is mounted in depending relation to the upper platen 22 and operates in combination with a cam follower 34 mounted on the bracket 26.

Finally, the apparatus of the die set comprises a guillotine blade holder 36 which is connected to the upper platen 22 to move therewith. The guillotine blade holder 36 carries a pointed guillotine blade 38 which is of sufficient depth and width to fully penetrate and sever the tube 20. As shown in FIG. 2, the jaws are arranged in sets 16a, 16b and 18a, 18b which are spaced apart along the axis of tube 20 to provide a clearance for the blades 30 and 38.

Both blades 30 and 38 are preferably constructed of hardened tool steel. Further details with respect to the apparatus of the die set are disclosed in U.S. Pat. No. 4,392,644 and the disclosure of that patent is incorporated herein by reference.

The die set of FIG. 1 is shown in the "closed" condition; i.e. the press has been actuated to displace the upper platen 22 fully toward the lower platen 10 to initiate and fully execute all of the clamping, notching and guillotine blade cutting functions. The sequence in detail is as follows. The apparatus of FIG. 1 starts off in the full "opened" condition wherein the upper platen 22 is as far away from the lower platen 10 as the guide pins and bushings permit. In the fully opened condition, the jaws 16 and 18 are slightly apart radially to permit the tube 20 to pass therethrough without obstruction, the guillotine blade 38 is poised above the tube 20 but out of contact therewith, and the notching blade arm 28 is in a rest position substantially to the right of that shown in FIG. 1 such that it lies across the tube 20 and essentially in the path of the guillotine blade 38. As the press is actuated to start the cutting function, the upper platen 22 starts downward and the cam 24 immediately closes the jaws 16 and 18 on the tube 20. Movement of the notching blade arm 28 is initiated by cam 32 and cam follower 34 substantially simultaneous with the closing of the clamping jaws 16 and 18; accordingly, the blade 30 starts movement from right to left across the top of the tube 20 as shown in FIG. 1. The guillotine blade 38 starts downwardly along with the upper platen 22 but does not contact the tube 20 until the notching blade 30 has cleared out of its path. The point of the guillotine blade 38 enters the tube 20 through the notches created by the cutting point of notching blade 30 and fully severs the tube without the undesirable formation of a dimple in the upper tube wall. Platen 22 is raised to open the die set to make ready for a repeat of the sequence.

Looking now to FIGS. 3, 4 and 5, the details of the cutting process and apparatus of the present invention will be described.

As shown in FIG. 3, the tube 20 comprises an inner wall 40 and an outer wall 42, both made of steel and both seam-welded. The thicknesses of the tube walls 40 and 42 are shown approximately equal in FIG. 3 but this is intended merely by way of illustration as variations in the tube thicknesses and compositions are common. Moreover, the invention, while most often used in connection with welded tube, may also be used to cut extruded and mechanically joined tube.

The method of the present invention involves, as the first step, the cutting of a first notch across the top of the tube 20 and along the depth line identified by the legend "1st CUT." It will be noted that this notch extend transversely of the longitudinal axis of the tube and extends substantially to the full radial depth of the outermost tube wall 42. Clearly, minor variations on this depth are possible. The second notching cut of the inventive method is made through the path of the 1st CUT and is identified in FIG. 2 by the depth line bearing the legend "2nd CUT." It will be noted that the depth of the 2nd CUT is less than that of the 1st CUT and is selected to extend only partially through the innermost tube wall 40. The cutting sequence is finished by causing the guillotine blade 38 to pass fully through the tube 20, the path of travel being transverse to the tube axis, transverse to the notching paths and entering the tube 20 through the coextensive notches which have been previously cut.

Looking to FIGS. 1 and 4, an apparatus for carrying out the method is described as follows. Blade 30, which is of the "pull-across" type has a rigid body portion having mounting holes 50 to receive threaded bolts machine screws or the like thereby to secure the blade into the arm 28. Blade 30 is further formed to define depending and staggered cutting points or teeth 44 and 46 which are spaced apart along the notching path so that cutting point 44 engages the tube 20 prior to the engagement of cutting point 46 with the tube 20. Moreover, the depths of the cutting points 44 and 46 are staggered or sequenced such that point 44 cuts shallower than point 46. Specifically, the depth of cutting point is selected such that, when the blade 30 is properly mounted in the arm 28 and the arm 28 is properly adjusted relative to the bracket 26, the cutting point 44 travels along the path identified in Figure by the legend "1st CUT." Cutting point 46 is deeper than 44 by a distance "d" which, as shown in FIG. 3, is exactly the difference between the depths of the first and second cuts. Accordingly, cutting point 46 forms the notching path identified in FIG. 3 by the legend "2nd CUT."

The thickness of the blade 30 may be slightly greater than that of the guillotine blade 38 to reduce frictional drag on the blade 38 as it penetrates tube 20.

Figure 5:
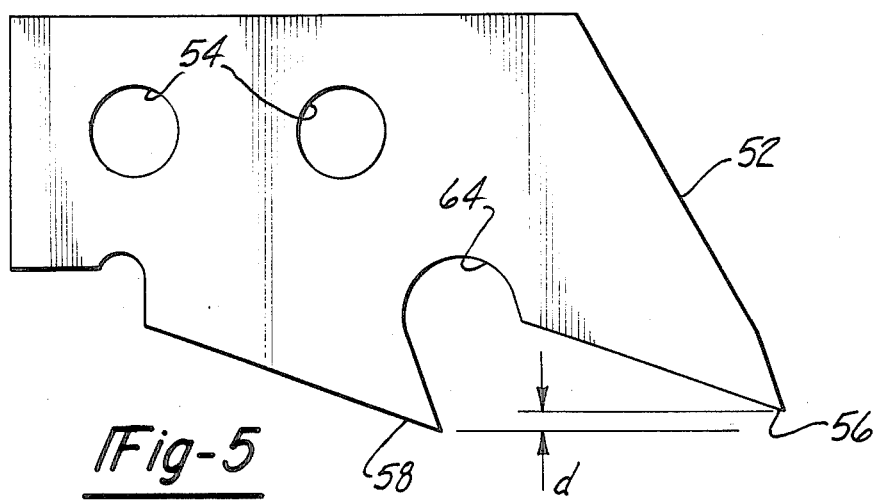
FIG. 5 is a plan view of a thrust type notching blade construction in accordance with the invention.

FIG. 5 illustrates the configuration of a notching blade 52 intended for use in apparatus of the "thrust" type; e.g., as shown in U.S. Pat. No. 4,036,091, the disclosure of which is incorporated by reference.

Figure 4:
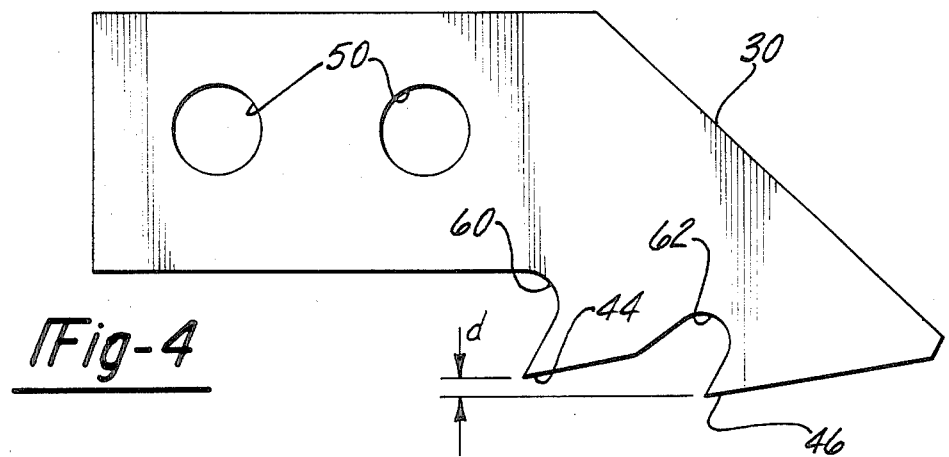
FIG. 4 is a plan view of a pull-across notching blade constructed in accordance with the invention.

The blade of in FIG. 5, cuts while moving from left to right, as shown in the drawing, rather than from right to left as is the case with respect to the blade 30 of FIG. 4. Blade 52 is precision machined from a body of hardened tool steel and exhibits mounting holes 54 to receive screws of the like for holding the blade to a suitable mounting structure. Blade 52 further exhibits a first cutting point 56 and a second cutting point 58, the cutting points being spaced along the path of travel so as to operate on the tube 20 in sequence. Moreover, the depth of the second point 58 is greater than the effective depth of the first point 56 by a distance "d" which corresponds precisely with the similarly identified dimension illustrated in FIG. 3. Accordingly, the first point 56 travels along the "1st CUT" line identified in FIG. 3 to notch fully through the outer wall 42 and the point 58 follows in sequence along the "2nd CUT" line to partially notch the inner tube wall 40.

An important feature of the blades 30 and 52 is the provision of a substantial relief functionally in front of each of the cutting points to provide a volume for the slug or chip of metal removed from the tube walls 40 and 42 during the notching functions. Specifically, it will be noted that a relief 60 is provided in front of the point 44 and a relief 62 is provided immediately functionally in front of the cutting point 46. Each of the reliefs 60 and 62 extends well into the blade body to provide substantial clearance for the material of the tube wall as it is peeled or cut from the tube by the notching points.

The blade 52 is provided, by reason of its nose configuration, with a relief forward of cutting point 46. A relief 64 is formed forward of cutting point 58 again for the purpose of providing clearance of volume of the material which is removed during the second cut of the tube 20 during the notching operation.

The method of using the blade shown in Figure 5 is exactly as defined above with reference to Figures 1 and 4 except for the fact that the notching blade 52 passes across the top of the tube 20 from left to right rather than from right to left. In a structure of the type shown in U.S. Pat. No. 4,036,091, the notching function is a full cycle comprising both left to right and right to left; i.e. "thrust" and "return" movements as the guillotine blade descends. However, it is also possible through the use of an offset notching blade support arm to use a half cycle wherein the notching blade 52 remains to the right of the tube 20 as the guillotine blade 38 passes through the notch and through the tube wall to finalize the severing function.

I claim:

1. A method for dimple free guillotine cutting of multiple wall tube comprising the steps of:
    cutting a first notch laterally of the tube axis to a depth substantially equal to the thickness of the outermost tube wall;
    cutting a second notch through the path of the first notch but to a greater depth, which greater depth extends partially through the innermost tube wall, the steps of cutting the first and second notches being performed in sequence during a single stroke of a notching blade relative to the tube; and
    severing the tube entirely with a guillotine blade which enters the tube through the notches.

2. The method defined in claim 1 wherein the steps of cutting the first and second notches are performed by pulling the blade across the tube axis.

3. The method defined in claim 1 wherein the steps of cutting the first and second notches are performed by thrusting the blade across the tube axis.

* * * * *

UNITED STATES PATENT AND TRADEMARK OFFICE
CERTIFICATE OF CORRECTION

PATENT NO. : 4,796,498

DATED : January 10, 1989

INVENTOR(S) : Borzym

It is certified that error appears in the above-identified patent and that said Letters Patent is hereby corrected as shown below:

Column 4, line 29, "Figure by" should be —Figure 3 by—.

Column 4, line 42, "blade of in" should be —blade in—.

Signed and Sealed this

Twenty-seventh Day of June, 1989

Attest:

DONALD J. QUIGG

*Attesting Officer*     *Commissioner of Patents and Trademarks*